US009209964B2

(12) United States Patent
Crews

(10) Patent No.: US 9,209,964 B2
(45) Date of Patent: Dec. 8, 2015

(54) SYSTEMS AND METHODS FOR DTE/DCE CESOP TIMING

(71) Applicant: Cornet Technology, Inc., Springfield, VA (US)

(72) Inventor: James Crews, Springfield, VA (US)

(73) Assignee: Cornet Technology, Inc., Springfield, VA (US)

( * ) Notice: Subject to any disclaimer, the term of this patent is extended or adjusted under 35 U.S.C. 154(b) by 0 days.

(21) Appl. No.: 14/184,546

(22) Filed: Feb. 19, 2014

(65) Prior Publication Data

US 2015/0236846 A1    Aug. 20, 2015

(51) Int. Cl.
*H03D 3/24* (2006.01)
*H04L 7/033* (2006.01)
*H04J 3/06* (2006.01)

(52) U.S. Cl.
CPC ............. *H04L 7/0331* (2013.01); *H04J 3/0632* (2013.01)

(58) Field of Classification Search
CPC ...................................... H04J 3/0632

USPC .......................................................... 375/376
See application file for complete search history.

(56) References Cited

U.S. PATENT DOCUMENTS

| 5,353,313 | A  | * | 10/1994 | Honea ........................... 375/372 |
|---|---|---|---|---|
| 5,734,341 | A  | * | 3/1998 | Walker ........................... 341/95 |
| 8,094,562 | B1 | * | 1/2012 | Baumbach et al. ........... 370/236 |
| 2004/0105516 | A1 | * | 6/2004 | Smith et al. ................... 375/354 |
| 2006/0008041 | A1 | * | 1/2006 | Kim et al. ..................... 375/371 |
| 2006/0221936 | A1 | * | 10/2006 | Rauchwerk ................... 370/352 |
| 2007/0105518 | A1 | * | 5/2007 | Chang et al. .................. 455/260 |
| 2008/0267325 | A1 | * | 10/2008 | Jou ............................... 375/344 |
| 2008/0290953 | A1 | * | 11/2008 | Sandner et al. ................... 331/2 |
| 2008/0298242 | A1 | * | 12/2008 | Fan et al. ....................... 370/235 |
| 2011/0234277 | A1 | * | 9/2011 | Stephens et al. .............. 327/158 |
| 2013/0170512 | A1 | * | 7/2013 | Schmelzer et al. ...... 372/29.012 |

* cited by examiner

*Primary Examiner* — Santiago Garcia
(74) *Attorney, Agent, or Firm* — Allen J. Moss; Squire Patton Boggs (US) LLP

(57) ABSTRACT

A system for locking subrate clocks includes a module that the system phase-locks an incoming subrate clock from a Data Communication Equipment device. A Circuit Emulation Services over Packet transmission network is used to connect the Data Communications Equipment device to a Data Terminal Equipment device. Synchronization between end points is maintained by the system.

7 Claims, 3 Drawing Sheets

SYSTEMS AND METHODS FOR DTE/DCE CESOP TIMING

TECHNICAL FIELD

Embodiments described herein generally relate to techniques for allowing legacy DCE/DTE (Data Communications Equipment/Data Terminal Equipment).

BACKGROUND

Since the early 1980s, companies with large data processing requirements have been using interfaces such as RS-232, V.35, RS-530, and X.21 to move large volumes of data between devices. As the companies expanded, it became necessary to move the data between facilities using modems or expensive leased lines (T1/DS3). In order to do this, the DTE-generated data was sent between sites using DCE devices such as modems or CSU/DSU units. These modems or CSU/DSUs generated clocks internally that then were sent to the DTE devices for data clocking in both directions (counter-directional timing).

As data speeds increased, clock/data skew became an issue using counter-directional clocking (DCE generated TC/RC). Co-directional timing was introduced in which both the DTE and DCE devices generated their own clocks in phase with the associated data.

As data infrastructure grew, it became necessary for 24/7 availability of data paths, so crosspoint matrix switches were developed to allow paring of DTE and DCE devices, as well as monitoring capabilities to diagnose issues. These matrix switches passed the data and clock signals without affecting the integrity or synchronicity of the signals.

Now that IP networks are widespread throughout large companies and the military, an edict has been given to migrate legacy interfaces to IP. In order to reduce cost by forklift upgrading, the CESoP technology (Circuit Emulation Services over Packet) was introduced that allowed users to place these devices between their equipment in lieu of the existing leased lines. Since the matrix connectivity is still required, the issue becomes synchronizing the clocks between the network endpoints. Traditionally, the CESoP device would derive its clocking from a common clock or generate a master internal clock on one side of the network and use adaptive clock recovery on the other. This works fine as long as the legacy devices are DTEs operating in counter-directional timing mode where all subrate clocks are derived from the master CESoP device clock.

SUMMARY

In some embodiments, a system for locking subrate clocks includes a module that the system phase-locks an incoming subrate clock from a Data Communication Equipment (DCE) device. In some configurations, a Circuit Emulation Services over Packet (CESoP) transmission network is used to connect the DCE device to a Data Terminal Equipment (DTE) device. Optionally, synchronization between end points is maintained by the system. In some configurations, the module synchronizes the DCE device and the DTE device in both directions of transmission. In some alternatives, the module includes the use of a series of three phase-locked loops to achieve synchronization. Optionally, the module includes a first phase-locked loop converter, the first phase-locked loop converter receiving a signal having a first bit rate from a device and up-converting the first bit rate to a second bit rate. The module further includes a second phase-locked loop converter, the second phase-locked loop converter receiving the signal having the second bit rate and up-converting the second bit rate to a third bit rate. The module further includes a divider, the divider receiving the third bit rate and dividing down the signal to provide second, third, fourth, and fifth signals, the second, third, fourth, and fifth signals having fourth, fifth, sixth, and seventh bit rates, each of the fourth, fifth, sixth, and seventh bit rates a multiple of the third bit rate. Optionally, the second, third, and fourth signals are used to provide the fourth, fifth, and sixth bit rate signals to a CESoP transmission network.

In some embodiments, a system for locking incoming subrate clocks includes a first phase-locked loop converter, the first phase-locked loop converter receiving a signal having a first bit rate from a device and up-converting the first bit rate to a second bit rate. The system further includes a second phase-locked loop converter, the second phase-locked loop converter receiving the signal having the second bit rate and up-converting the second bit rate to a third bit rate. The system further includes a divider, the divider receiving the third bit rate and dividing down the signal to provide second, third, fourth, and fifth signals, the second, third, fourth, and fifth signals having fourth, fifth, sixth, and seventh bit rates, each of the fourth, fifth, sixth, and seventh bit rates a multiple of the third bit rate. Optionally, the second, third, and fourth signals are used to provide the fourth, fifth, and sixth bit rate signals to a CESoP transmission network. Alternatively, the CESoP transmission network is used to connect a DCE device to a DTE device. In one alternative, synchronization between end points is maintained by the system. In another alternative, the system phase-locks an incoming subrate clock from the DCE device. Optionally, the system phase-locks an incoming subrate clock from the DTE device.

In some embodiments, a method of locking subrate clocks includes phase-locking an incoming subrate clock from a DCE device. Optionally, the method further includes connecting the DCE device to a DTE device over a CESoP transmission network. Optionally, the method further includes maintaining synchronization between end points of the CESoP transmission network. Alternatively, the method further includes synchronizing the DCE device and the DTE device in both directions of transmission. Optionally, the method further includes comprising using a series of three phase-locked loops to achieve synchronization. Alternatively, a module performs the synchronizing and the module includes a first phase-locked loop converter, the first phase-locked loop converter receiving a signal having a first bit rate from a device and up-converting the first bit rate to a second bit rate. The module further includes a second phase-locked loop converter, the second phase-locked loop converter receiving the signal having the second bit rate and up-converting the second bit rate to a third bit rate. The module further includes a divider, the divider receiving the third bit rate and dividing down the signal to provide second, third, fourth, and fifth signals, the second, third, fourth, and fifth signals having fourth, fifth, sixth, and seventh bit rates, each of the fourth, fifth, sixth, and seventh bit rates a multiple of the third bit rate. Optionally, the second, third, and fourth signals are used to provide the fourth, fifth, and sixth bit rate signals to a CESoP transmission network.

DETAILED DESCRIPTION OF THE DRAWINGS

Described herein are embodiments of systems and methods for DTE/DCE CESoP Timing. Although the system described herein is primarily applied to DTE and DCE systems, the principals provided herein may be utilized in other contexts.

With the current mandate to connect legacy interfaces via IP networks and maintain the ability to spare and monitor the devices, CESoP devices were designed. One inherent issue with CESoP is maintaining synchronization between endpoints in a co-directional DTE/DCE clocking scenario, since clocking is traditionally provided by the CESoP devices to the endpoints. The embodiments use extra PLL technology to phase-lock to the incoming subrate clocks originating in the DTE or DCE device. This allows the CESoP to synchronize to the connected devices in both data directions simultaneously.

Embodiments provide devices to clock a CESoP (Circuit Emulation Services over Packet) connection, thus allowing DTE to DCE, DTE to DCE (XTC or External Transmit Clock), DTE to DTE (ME or Message Storage), DTE to DTE (XTC), and DCE to DCE (XTC) timing scenarios to be realized in the CESoP environment, using a Circuit Emulation Service over Packet standards CESoP device.

In order to facilitate co-directional clocking schemes between DTE/DCE devices, embodiments incorporate the use of PLL technology to upscale the subrate input clocks such that they may be used to synchronize the CESoP link. Each circuit is independent and utilizes a series of three PLLs to achieve end-to-end synchronization in the various co-directional clocking modes of operation between DTE/DCE devices.

Figure 1:
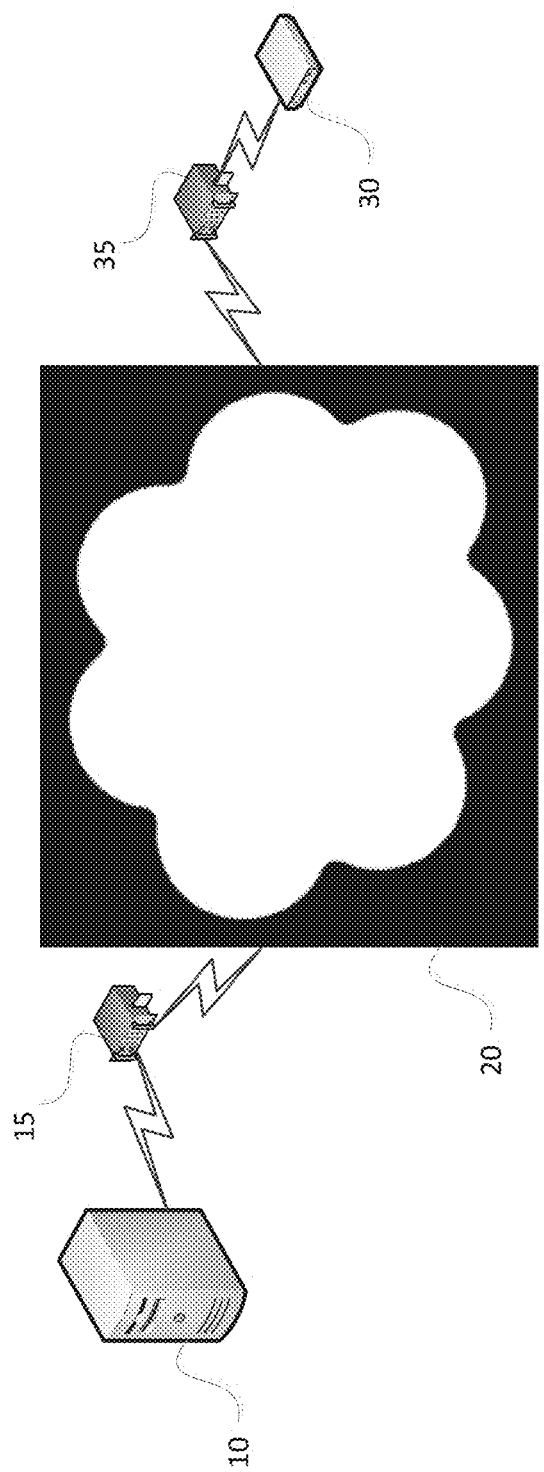
FIG. 1 shows a block diagram of one embodiment of a system for DTE/DCE CESoP Timing.

FIG. 1 shows a basic system diagram for embodiments of systems for DTE/DCE CESoP Timing. This may be referred to as a module. A first device 10 communicates over a packet switched network 20 with a second device 30. Device 10 may interface through a CESoP device 15. CESoP device 15 may provide for co-directional clocking schemes. CESoP device 30 may also provide for co-directional clocking schemes. Co-directional clocking schemes may be realized as explained herein.

Figure 2:
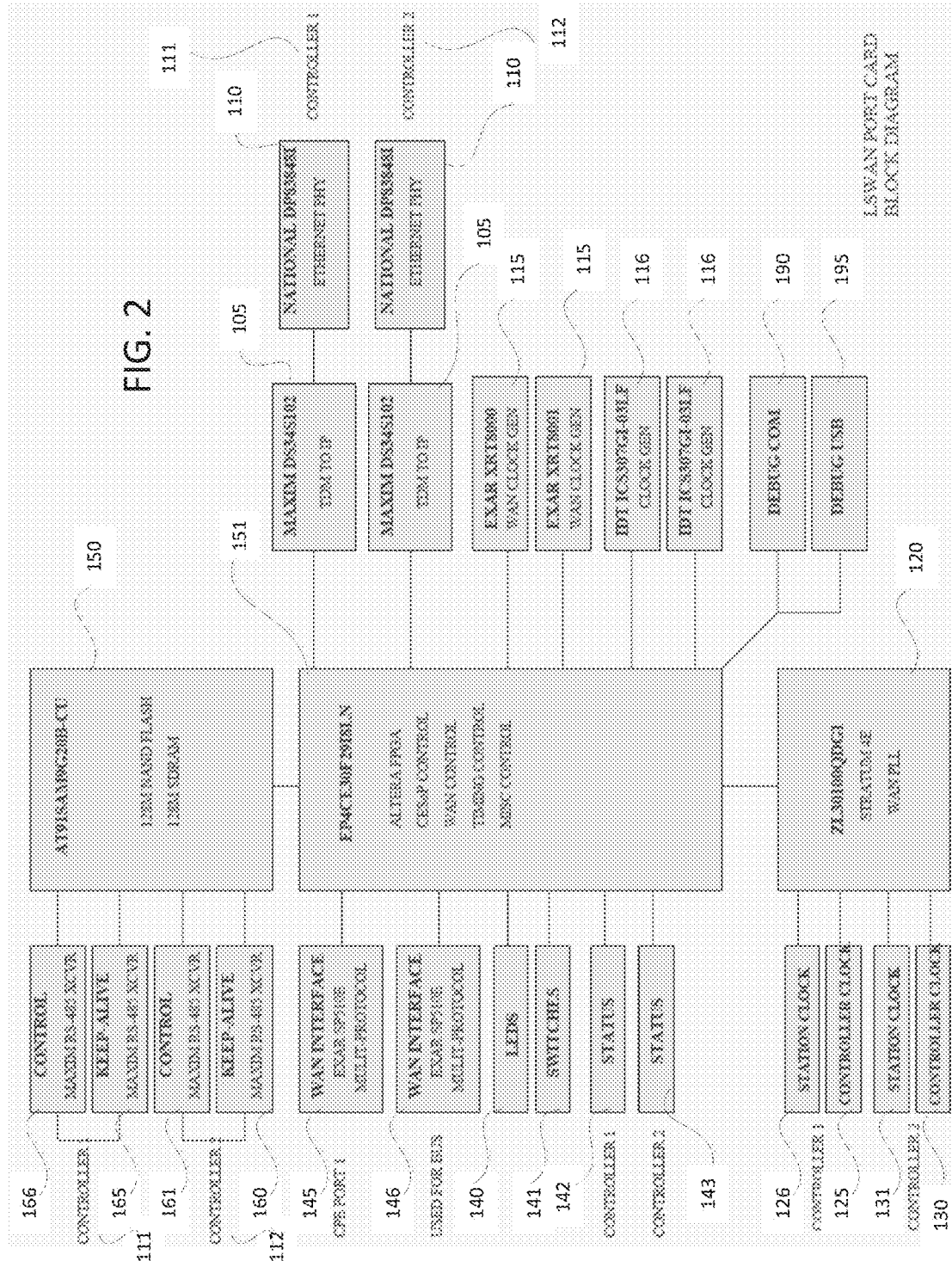
FIG. 2 shows a block diagram of one embodiment of an IPGATE-AC LSWAN card, which may be used in the system of FIG. 1.

One embodiment of a card that may be used to provide co-directional clocking is shown in FIG. 2. This card may be described as an IPGATE-AC LSWAN card. Although this card is described in terms of hardware, software-based or partial software-based systems may be substituted.

Time Division Multiplexing (TDM) to IP (Internet Protocol) Functionality

The Maxim DS34S102 CESoP chip 105 is used to convert incoming WAN interface to a wide variety of Ethernet protocols, via interface 110 (which in this example is a National DP838481 transceiver), including IPv4, IPv6, RTP, UDP, and MPLS. The device supports VLANs (Virtual Local Area Networks) and priority queuing. The IPGATE-AC-LSWAN card will support Asynchronous, Synchronous sub-rate, Nx56K, and Nx64K transmission up to 2.048 Mbps using the TDMoIP or CESoPSN structured mode of the DS34S102.

Interfaces

The LSWAN card supports RS232, V.35, RS530, RS530A, and X.21 by using an Exar SP510EM Multi-protocol Interface device 145. The SP510EM 145 supports both data/clock, as well as control lead functions. The SP510EM 145 supports on-chip termination based on the selected interface. For interfaces like the MD1324, the termination can be bypassed. Exar SP510EM Multi-protocol Interface device 146 may also be used for BUS functions. The ports can be individually strapped for either DTE or DCE operation via on-board DIP switches. The system also includes serially programmable clock sources 116, which may be IDT ICS307GI-03LF in some embodiments.

Control Leads

The card can be set to source control leads based on DCE communications status, or they can be passed end to end. Control leads can be forced high or low as well. When control leads are set to pass through, one data channel is occupied with the mixed control leads; therefore, the maximum bit rate the card can do with control leads is 1.984 Mbps. If 2.048 Mbps operation is needed, the control leads can be set to IPGATE mode (not passed).

Timing

The Port card supports dual station clocks, 126, 131 via a ZL30100QDG1 WAN PLL 120. ZL30100QDG1 WAN PLL 120 is a clock synchronizer, and other examples of clock synchronizers may be substituted in some configurations. The input sources for the PLL can come from an on-board oscillator, Controller 1 clock 125 or Controller 2 clock 130, recovered clock, or DTE/DCE input clock. The Zarlink WAN PLL 120 supports Stratum 4E precision as well as holdover mode.

Ethernet Redundancy

In an IPGATE-AC, each card supports two types of redundancy depending on the build option. The first is full redundancy where each card has separate TDM over Packet Transport Devices, such as DS34S102 devices where one is attached to the Controller 1 111 network and the other is attached to the Controller 2 112 network. If a failure occurs in the Active network, the card will automatically switch to the redundant network. Transceivers 161, 166 (which may be a Maxim RS-485 XCVR transceiver) may provide for signaling. The second form of redundancy requires only a single controller to be populated. This form of redundancy sends duplicate packets with the same data to the destination port. If the first packet arrives un-corrupted, the second packet is discarded. This is useful in networks with diverse routing implemented. The duplicate packet redundancy can also be used with the full redundancy to achieve a very high level of redundancy options. The active controller also may send keep-alive packets via transceivers 165, 160 (which may be a Maxim RS-485 XCVR transceiver) to each port card so that any data corruption can be detected as well. The frequency of the keep-alive packets can be adjusted to achieve the optimum switchover time. During maintenance operations or testing, the port card also can be made to switch to the alternate controller network via the web server or SNMP management software.

BERT and Diagnostics

Each card may support BERT (Bit Error Rate) testing in either direction via FPGA (Field Programmable Gate Array)-based circuit 151. FPGA 151 may be an Altera FPGA such as model EP4CE30F29I8LN. The BERT will provide statistical and availability information in addition to bit and error counting. Each card supports local and remote loopbacks toward the customer side of the interface. In addition, network loops are also supported.

DACX Support

In order to support the DACX capability built in to the IPGATE-AC, the Port card can be directed to receive and transmit to/from the backplane TDM interface that terminates at the TSA (Time Slot Assigner circuit) on each controller. The TDM bus supports up to 128 channels of data. In the case of the LSWAN card, port 1 data is placed on channels 1-32 of the outbound TDM stream. Likewise, the inbound data is extracted from channels 1-32. The TDM buses are timed by Controllers 1 and 2 such that all ports in the IPGATE-AC are synchronized, and a variety of DACX options can be realized, as well as a matrix switch within the chassis itself allowing any port to be connected to any other port within the chassis. The TDM bus signals are described in the controller section of this document. Control lead information can be passed via channel 33.

Control

An Atmel AT91SAM9G20B-CU ARM CPU 150 is used to control the functionality of the card. The CPU 150 communicates status and accepts commands from the main controllers via two serial ports which run up to 230.4 Kbps.

Another set of serial ports are connected to Controllers 1 and 2 for the keep-alive messages that are sent at periodic intervals by the controllers. If the CPU has not received a keep-alive message from the active controller in a specific time, the network selection of the port will automatically switch to the backup network.

The CPU also has a serial port 190 connected through an RS232 transceiver to a Micro DB9 connector which is used to debug and load initial code into the card. The card also has an USB port 195 for debugging and code loading.

The CPU configures the DS34S102 devices on power-up with default configuration and waits for the Active Controller card to set the last saved user configuration. During normal operation, the CPU dynamically configures each device based on commands received by the Active Controller. The CPU also controls the various FPGA configuration options for port control.

DTE/DCE Clocking Circuit

Figure 3:
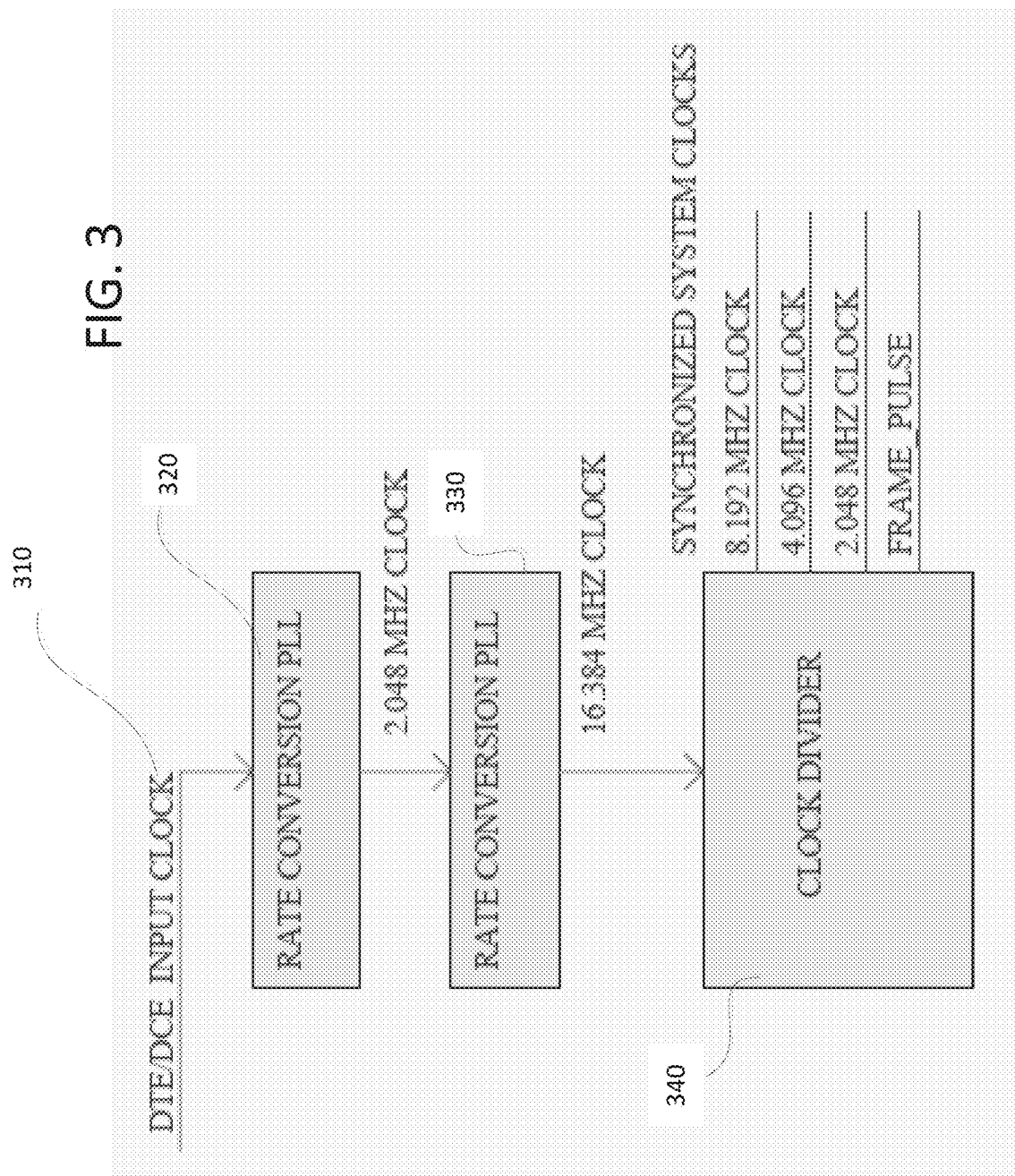
FIG. 3 shows a block diagram for one embodiment of an IPGATE-AC LSWAN card DTE/DCE Clocking circuit, which may be used in the system of FIG. 1.

FIG. 3 shows a block diagram for the IPGATE-AC LSWAN card DTE/DCE clocking circuit.

The input 310 of Nx56K or Nx64K Bits Per Second (BPS) clock is up-converted via PLL 320 (phase locked loop) to 2.048 MHz. This 2.048 MHz is the input rate on a second PLL 330 which is sourced from either the rate conversion PLL or the recovered CESoP clock. The second PLL up-converts the frequency to 16.384 MHz which then is divided down by clock divider 340 to supply 8.192 MHz, 4.096 MHz, and 2.048 MHz to the CESoP system. The 2.048 MHz then is used to create the 125 uS Frame Pulse needed for the system.

Various embodiments of systems and methods for systems and methods for DTE/DCE CESoP Timing may be implemented fully or partially in software and/or firmware. This software and/or firmware may take the form of instructions contained in or on a non-transitory computer-readable storage medium. Those instructions then may be read and executed by one or more processors to enable performance of the operations described herein. The instructions may be in any suitable form such as, but not limited to, source code, compiled code, interpreted code, executable code, static code, dynamic code, and the like. Such a computer-readable medium may include any tangible non-transitory medium for storing information in a form readable by one or more computers such as, but not limited to, read only memory (ROM), random access memory (RAM), magnetic disk storage media, optical storage media, a flash memory, etc.

The previous detailed description is of a small number of embodiments for implementing the systems and methods for DTE/DCE CESoP Timing and is not intended to be limiting in scope. The following claims set forth a number of the embodiments of the systems and methods for DTE/DCE CESoP Timing disclosed with greater particularity.

What is claimed:

1. A system for locking subrate clocks, comprising:
    a module that the system phase-locks an incoming subrate clock from a Data Communication Equipment device, wherein a Circuit Emulation Services over Packet transmission network is used to connect the Data Communications Equipment device to a Data Terminal Equipment device, synchronization between end points is maintained by the system, the module synchronizes the Data Communications Equipment device and the Data Terminal Equipment device in both directions of transmission, the module synchronizes the Data Communications Equipment device and the Data Terminal Equipment device in both directions of transmission, the module synchronizes the Data Communications Equipment device and the Data Terminal Equipment device in both directions of transmission, the module includes the use of a series of three phase-locked loops to achieve synchronization, and
    the module includes:
        a first phase-locked loop converter, the first phase-locked loop converter receiving a signal having a first bit rate from a device and up-converting the first bit rate to a second bit rate;
        a second phase-locked loop converter, the second phase-locked loop converter receiving the signal having the second bit rate and up-converting the second bit rate to a third bit rate; and
        a divider, the divider receiving the third bit rate and dividing down the signal to provide second, third, fourth, and fifth signals, the second, third, fourth, and fifth signals having fourth, fifth, sixth, and seventh bit rates, each of the fourth, fifth, sixth, and seventh bit rates a multiple of the third bit rate, and the second, third, and fourth signals are used to provide the fourth, fifth, and sixth bit rate signals to a Circuit Emulation Services over Packet transmission network.

2. A system for locking incoming subrate clocks, comprising:
    a first phase-locked loop converter, the first phase-locked loop converter receiving a signal having a first bit rate from a device and up-converting the first bit rate to a second bit rate;
    a second phase-locked loop converter, the second phase-locked loop converter receiving the signal having the second bit rate and up-converting the second bit rate to a third bit rate; and
    a divider, the divider receiving the third bit rate and dividing down the signal to provide second, third, fourth, and fifth signals, the second, third, fourth, and fifth signals having fourth, fifth, sixth, and seventh bit rates, each of the fourth, fifth, sixth, and seventh bit rates a multiple of the third bit rate, wherein the second, third, and fourth signals are used to provide the fourth, fifth, and sixth bit rate signals to a Circuit Emulation Services over Packet transmission network.

3. The system of claim 1, wherein the Circuit Emulation Services over Packet transmission network is used to connect a Data Communications Equipment device to a Data Terminal Equipment device.

4. The system of claim 3, wherein synchronization between end points is maintained by the system.

5. The system of claim 4, wherein the system phase-locks an incoming subrate clock from the Data Communication Equipment device.

6. The system of claim 5, wherein the system phase-locks an incoming subrate clock from the Data Terminal Equipment device.

7. A method of locking subrate clocks, comprising:

phase-locking an incoming subrate clock from a Data Communication Equipment device;
    connecting the Data Communications Equipment device to a Data Terminal Equipment device over a Circuit Emulation Services over Packet transmission network;
    maintaining synchronization between end points of the Circuit Emulation Services over Packet transmission network;
    synchronizing the Data Communications Equipment device and the Data Terminal Equipment device in both directions of transmission; and
using a series of three phase-locked loops to achieve synchronization;
wherein a module performs the synchronizing and the module includes:
    a first phase-locked loop converter, the first phase-locked loop converter receiving a signal having a first bit rate from a device and up-converting the first bit rate to a second bit rate;
    a second phase-locked loop converter, the second phase-locked loop converter receiving the signal having the second bit rate and up-converting the second bit rate to a third bit rate; and
    a divider, the divider receiving the third bit rate and dividing down the signal to provide second, third, fourth, and fifth signals, the second, third, fourth, and fifth signals having fourth, fifth, sixth, and seventh bit rates, each of the fourth, fifth, sixth, and seventh bit rates a multiple of the third bit rate; and
wherein the second, third, and fourth signals are used to provide the fourth, fifth, and sixth bit rate signals to a Circuit Emulation Services over Packet transmission network.

* * * * *